United States Patent
Hsiao et al.

(10) Patent No.: US 12,541,388 B2
(45) Date of Patent: *Feb. 3, 2026

(54) KERNEL PROTECTION SYSTEM

(71) Applicant: MEDIATEK INC., Hsin-Chu (TW)

(72) Inventors: Chih-Hsiang Hsiao, Hsinchu (TW); Pei-Lun Suei, Hsinchu (TW); Yu-Chi Chu, Hsinchu (TW)

(73) Assignee: MEDIATEK INC., Hsinchu (TW)

( * ) Notice: Subject to any disclaimer, the term of this patent is extended or adjusted under 35 U.S.C. 154(b) by 778 days.

This patent is subject to a terminal disclaimer.

(21) Appl. No.: 17/853,950

(22) Filed: Jun. 30, 2022

(65) Prior Publication Data

US 2023/0087520 A1    Mar. 23, 2023

Related U.S. Application Data

(60) Provisional application No. 63/245,235, filed on Sep. 17, 2021.

(51) Int. Cl.
  *G06F 9/455*    (2018.01)

(52) U.S. Cl.
  CPC .. *G06F 9/45558* (2013.01); *G06F 2009/4557* (2013.01); *G06F 2009/45583* (2013.01); *G06F 2009/45587* (2013.01)

(58) Field of Classification Search
  CPC ......... G06F 9/45558; G06F 2009/4557; G06F 2009/45583; G06F 2009/45587; G06F 21/53; G06F 21/6281
  See application file for complete search history.

(56) References Cited

U.S. PATENT DOCUMENTS

| | | | |
|---|---|---|---|
| 8,984,478 B2 * | 3/2015 | Epstein | G06F 9/45558 717/110 |
| 9,223,966 B1 | 12/2015 | Satish | |

(Continued)

FOREIGN PATENT DOCUMENTS

| | | |
|---|---|---|
| CN | 103258150 A | 8/2013 |
| CN | 107924441 A | 4/2018 |

(Continued)

OTHER PUBLICATIONS

Search Report mailed/issued on Feb. 10, 2023 for EP application No. 22186802.9, pp. 1-10.

(Continued)

*Primary Examiner* — Jacob D Dascomb
*Assistant Examiner* — Kevin X Lu
(74) *Attorney, Agent, or Firm* — Winston Hsu

(57) ABSTRACT

A system for kernel protection includes a processor and a transmission interface. The processor is arranged to execute at least one guest virtual machine (VM), at least one primary VM, and a hypervisor. The at least one guest VM is arranged to send at least one command to a command hub. The at least one primary VM is arranged to manage and configure a safety setting according to the at least one command from the command hub and at least one policy, and manage and configure a safety protection component according to the safety setting. The hypervisor is arranged to manage and configure the safety protection component according to a ground rule and at least one safety setting command from the at least one primary VM. The transmission interface is arranged to bind the at least one primary VM to the hypervisor.

12 Claims, 6 Drawing Sheets

(56) References Cited

U.S. PATENT DOCUMENTS

| | | | |
|---|---|---|---|
| 9,520,994 B2 | 12/2016 | Ponsini | |
| 10,395,029 B1 | 8/2019 | Steinberg | |
| 11,693,680 B2* | 7/2023 | Speak | G06F 9/4451 718/1 |
| 12,073,005 B2 | 8/2024 | Knierim | |
| 2007/0168641 A1* | 7/2007 | Hummel | G06F 9/45558 711/206 |
| 2009/0089527 A1 | 4/2009 | Schoenberg | |
| 2012/0047580 A1 | 2/2012 | Smith | |
| 2012/0054744 A1* | 3/2012 | Singh | G06F 21/6218 718/1 |
| 2013/0347064 A1 | 12/2013 | Aissi | |
| 2013/0347131 A1 | 12/2013 | Mooring | |
| 2015/0270960 A1 | 9/2015 | Ponsini | |
| 2016/0246730 A1 | 8/2016 | Gandhi | |
| 2016/0277447 A1* | 9/2016 | Pope | H04L 63/06 |
| 2017/0149778 A1 | 5/2017 | Gill | |
| 2017/0249457 A1 | 8/2017 | Tsirkin | |
| 2018/0189092 A1 | 7/2018 | Sanchez Leighton | |
| 2018/0278498 A1* | 9/2018 | Zeng | H04L 43/026 |
| 2019/0026035 A1 | 1/2019 | Gokhale | |
| 2019/0042467 A1 | 2/2019 | Sahita | |
| 2019/0266000 A1 | 8/2019 | Tsirkin | |
| 2020/0019697 A1 | 1/2020 | Shen | |
| 2020/0073691 A1 | 3/2020 | Tsirkin | |
| 2020/0218685 A1 | 7/2020 | Lu | |
| 2020/0301600 A1* | 9/2020 | Hu | G06F 3/0604 |
| 2020/0326971 A1 | 10/2020 | Yang | |
| 2020/0409759 A1 | 12/2020 | Tsirkin | |
| 2021/0026654 A1* | 1/2021 | Soman | G06F 21/31 |
| 2021/0026950 A1 | 1/2021 | Ionescu | |
| 2021/0089468 A1 | 3/2021 | Hao | |
| 2021/0149741 A1 | 5/2021 | Mooring | |
| 2021/0160243 A1 | 5/2021 | Sharma | |
| 2021/0240638 A1 | 8/2021 | Deutsch | |
| 2021/0303734 A1 | 9/2021 | Tsirkin | |
| 2021/0342176 A1 | 11/2021 | Tsirkin | |
| 2021/0409199 A1 | 12/2021 | Tsirkin | |
| 2022/0019698 A1 | 1/2022 | Durham | |
| 2022/0027265 A1 | 1/2022 | Li | |
| 2022/0030023 A1* | 1/2022 | Soman | H04L 63/20 |
| 2022/0035647 A1* | 2/2022 | Tsirkin | G06F 12/0646 |
| 2022/0045853 A1 | 2/2022 | Buendgen | |
| 2022/0350631 A1 | 11/2022 | Parry-Barwick | |
| 2022/0374349 A1* | 11/2022 | Chisnall | G06F 12/1441 |
| 2022/0413909 A1* | 12/2022 | Kakaiya | G06F 9/4887 |
| 2023/0064455 A1 | 3/2023 | Eyole | |
| 2023/0092808 A1 | 3/2023 | Hsiao | |
| 2023/0169343 A1 | 6/2023 | Lin | |

FOREIGN PATENT DOCUMENTS

| | | |
|---|---|---|
| CN | 109086100 A | 12/2018 |
| CN | 113330723 A | 8/2021 |
| EP | 2 606 450 | 6/2013 |
| EP | 2 606 450 A2 | 6/2013 |
| EP | 2 606 450 B1 | 9/2015 |
| TW | 200842646 | 11/2008 |
| TW | 201833775 A | 9/2018 |
| TW | 201944280 A | 11/2019 |
| TW | 202113648 A | 4/2021 |
| TW | 202125224 A | 7/2021 |

OTHER PUBLICATIONS

Hsiao, the specification, including the claims, and drawings in the U.S. Appl. No. 17/840,652, filed Jun. 15, 2022.

Hsiao, the specification, including the claims, and drawings in the U.S. Appl. No. 17/849,694, filed Jun. 26, 2022.

* cited by examiner

KERNEL PROTECTION SYSTEM

CROSS REFERENCE TO RELATED APPLICATIONS

This application claims the benefit of U.S. provisional application No. 63/245,235, filed on Sep. 17, 2021 and incorporated herein by reference.

BACKGROUND

For Android's high-level operating system (OS) that uses a monolithic OS (e.g. a Linux) as a kernel, if the kernel runs too many drivers or software, security vulnerabilities will occur in the kernel. To address this issue, kernel protection products are usually made through the hypervisor for devices with network applications, wherein the kernel protection mechanism ensures the perception and blocking of vulnerabilities and leaks by monitoring, filtering, and protection.

In addition, based on performance and cost considerations, a thinner and lighter hypervisor is usually used for kernel protection. Under the situation that the system with the hypervisor supports too many guest virtual machines (VMs), the management ability of the hypervisor may be insufficient (e.g. the complexity of the software that the hypervisor can run may be limited, and the hypervisor may be difficult to effectively perform security analysis), and the system may have security concerns (e.g. the kernel protection mechanism inside the hypervisor itself will be harmful to the hypervisor). As a result, a novel system that may share management for the hypervisor to release the complexity of the hypervisor is urgently needed.

SUMMARY

It is therefore one of the objectives of the present invention to provide a system for kernel protection, a command hub that runs on a processor or implemented by pure hardware, and a primary virtual machine (VM) that runs on a processor, to address above-mentioned issues.

According to at least one embodiment of the present invention, a system for kernel protection is provided. The system may include a processor and a transmission interface. The processor may be arranged to execute at least one guest virtual machine (VM), at least one primary VM, and a hypervisor. The at least one guest VM may be arranged to send at least one command to a command hub. The at least one primary VM may be arranged to: receive the at least one command sent from the command hub, receive at least one policy, and manage and configure a safety setting according to the at least one command and the at least one policy, wherein the at least one policy corresponds to the at least one guest VM. The hypervisor may be arranged to receive a ground rule and at least one safety setting command sent by the at least one primary VM, and manage and configure at least one safety protection component according to the ground rule and the at least one safety setting command. The transmission interface may be arranged to bind the at least one primary VM to the hypervisor, and perform communications between the at least one primary VM and the hypervisor.

According to at least one embodiment of the present invention, a command hub that runs on a processor or is implemented by pure hardware is provided. The command hub may be arranged to receive at least one command sent from at least one guest virtual machine (VM), and send the at least one command to at least one primary VM, wherein the at least one command sent from the command hub together with at least one policy corresponding to the at least one guest VM are utilized to manage and configure a safety setting for the at least one guest VM, and the safety setting is utilized to manage and configure a safety protection component.

According to at least one embodiment of the present invention, a primary virtual machine (VM) that runs on a processor is provided. The primary VM may include an agent, a kernel protection manager, and a protection manager. The agent may be arranged to receive at least one command sent from at least one guest VM. The kernel protection manager may be arranged to receive the at least one command sent from the agent and at least one policy, and manage and configure a safety setting for the at least one guest VM according to the at least one command and the at least one policy, wherein the at least one policy corresponds to the at least one guest VM. The protection manager may be arranged to manage and configure a safety protection component according to the safety setting provided by the kernel protection manager.

One of the benefits of the present invention is that, by sharing management for the hypervisor through primary VMs (i.e. offloading at least a portion of a management task of the hypervisor to the primary VMs), the complexity of the hypervisor may be released, and the guest VMs may be allowed to run more complex software. In addition, instead of integrating the policies into the hypervisor, the vendors of the guest VMs only need to provide the policies to the primary VMs. As a result, the cost, the convenience, and the safety in the mass production stage of the products that include the system for kernel protection may be improved. In other words, the hypervisor only needs to execute a ground rule (i.e. the policies that correspond to the guest VMs, respectively, may be executed by the primary VMs), which makes the hypervisor more secure. Since the execution loss of the policies is not the main loss, the performance of the products that include the system for kernel protection will not be degraded.

These and other objectives of the present invention will no doubt become obvious to those of ordinary skill in the art after reading the following detailed description of the preferred embodiment that is illustrated in the various figures and drawings.

DETAILED DESCRIPTION

Certain terms are used throughout the following description and claims, which refer to particular components. As one skilled in the art will appreciate, electronic equipment manufacturers may refer to a component by different names. This document does not intend to distinguish between components that differ in name but not in function. In the following description and in the claims, the terms "include" and "comprise" are used in an open-ended fashion, and thus should be interpreted to mean "include, but not limitedto . . .".

Figure 1:
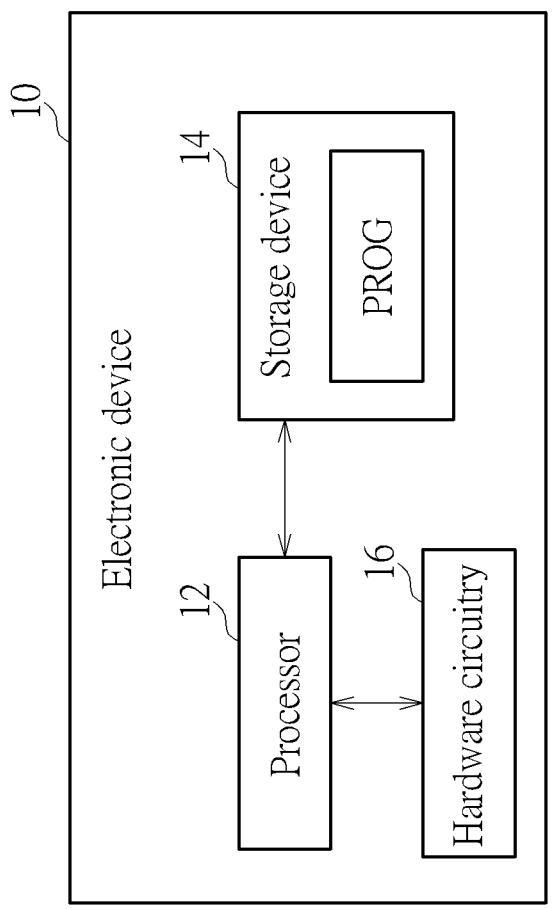
FIG. 1 is a diagram illustrating an electronic device according to an embodiment of the present invention.

FIG. 1 is a diagram illustrating an electronic device 10 according to an embodiment of the present invention. Byway of example, but not limitation, the electronic device 10 may be a portable device such as a smartphone or a tablet. The electronic device 10 may include a processor 12, a storage device 14, and a hardware circuitry 16. The processor 12 may be a single-core processor or a multi-core processor. The storage device 14 is a computer-readable medium, and is arranged to store computer program code PROG. The processor 12 is equipped with software execution capability. The computer program code PROG may include a plurality of software modules. Hence, when loaded and executed by the processor 12, the computer program code PROG instructs the processor 12 to perform designated functions of the software modules. The electronic device 10 may be regarded as a computer system using a computer program product that includes a computer-readable medium containing the computer program code. The hardware circuitry 16 is pure hardware that may consist of logic gates only, and performs designated functions without software execution. Regarding a system for kernel protection as proposed by the present invention, it may be embodied on the electronic device 10. For example, the system for kernel protection may include software-based functions implemented by computer program code PROG running on the processor 12 and hardware-based functions implemented by the hardware circuitry 16.

Figure 2:
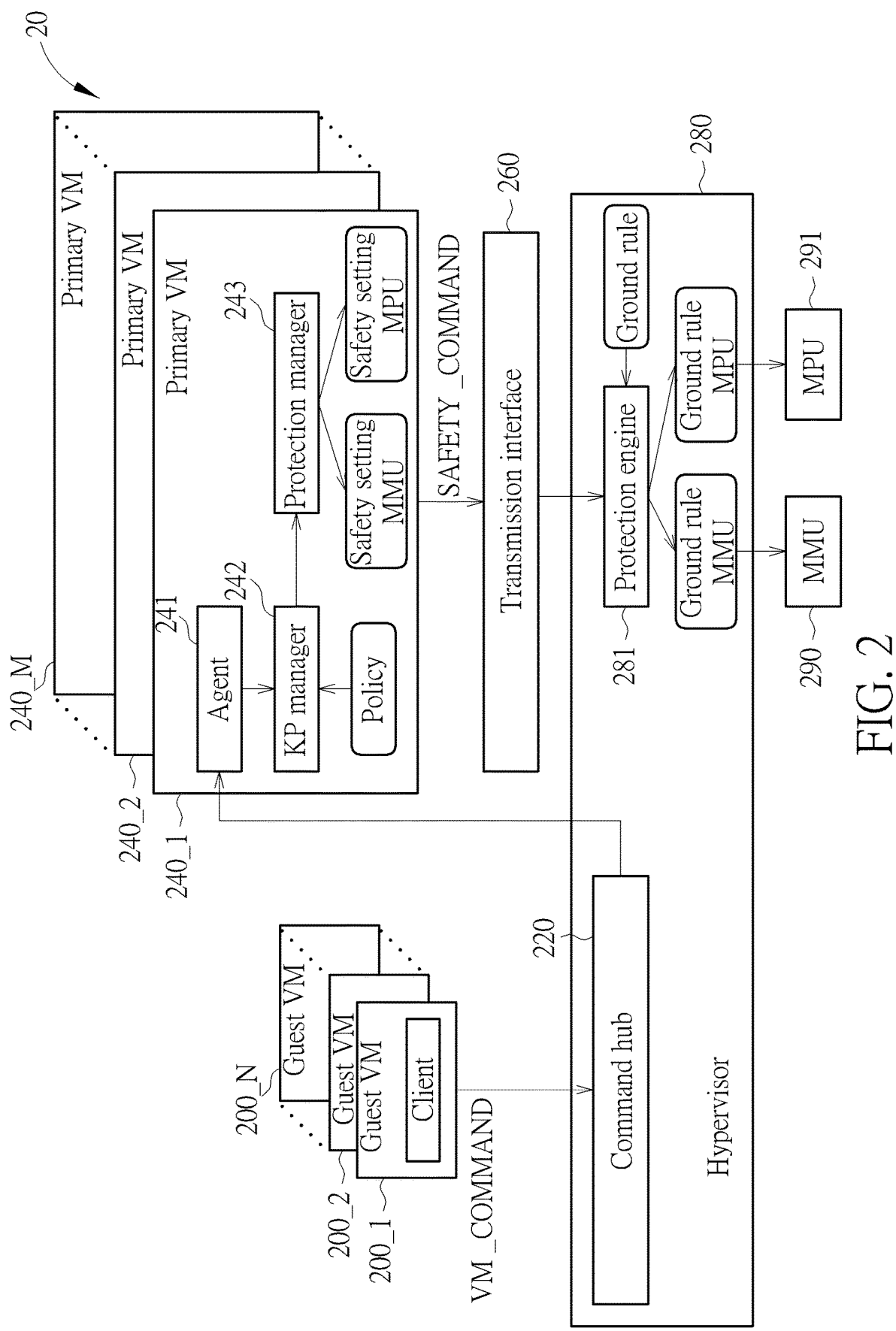
FIG. 2 is a diagram illustrating a system for kernel protection according to an embodiment of the present invention.

FIG. 2 is a diagram illustrating a system 20 for kernel protection according to an embodiment of the present invention. The system 20 may include a processor (e.g. the processor 12 shown in FIG. 1) and a transmission interface 260. The processor may be arranged to execute software modules, including one or more guest virtual machines (VMs) 200_1, 200_2, . . . , 200_N (N≥1), one or more primary VMs 240_1, 240_2, . . . , 240_M (M≥1), and a hypervisor 280. The guest VMs 200_1, 200_2, . . . , 200_N may be provided by different vendors, and "N" and "M" are positive integers that may be equal to or different from each other. In addition, the processor may be further arranged to execute a command hub 220 that is a software module integrated in the hypervisor 280, but the present invention is not limited thereto. In some embodiments, the command hub 220 may be a hardware component external to the hypervisor 280 executed on the processor. In some embodiments, the transmission interface 260 can be implemented by either software or hardware.

As shown in FIG. 2, each of the guest VMs 200_1, 200_2, . . . , 200_N may be arranged to send at least one command VM_COMMAND to the command hub 220. For example, the guest VM 200_1 may be an Android VM with a Linux kernel, wherein at least one client in the Android VM may send the at least one command VM_COMMAND to the command hub 220. In some embodiments, at least one application in the Android VM may also be capable of sending the at least one command VM_COMMAND to the command hub 220. Each of the primary VMs 240_1, 240_2, . . . , 240_M may include an agent 241, a kernel protection manager 242 (for brevity, labeled as "KP manager" in FIG. 2), and a protection manager 243. The command hub 220 may be arranged to broadcast the at least one command VM_COMMAND to each agent 241 in the primary VMs 240_1, 240_2, . . . , 240_M, or may send the at least one command VM_COMMAND to a specific agent of a primary VM selected from the primary VMs 240_1, 240_2, . . . , 240_M according to the type of the at least one command VM_COMMAND. As a result, the command hub 220 may be arranged to perform communications between the guest VMs 200_1, 200_2, . . . , 200_N and the primary VMs 240_1, 240_2, . . . , 240_M.

The agent 241 may be arranged to receive the at least one command VM_COMMAND sent from the command hub 220. The kernel protection manager 242 may be arranged to receive the at least one command VM_COMMAND from the agent 241 and at least one policy, and manage and configure a safety setting for the guest VMs 200_1, 200_2, . . . , 200_N according to the at least one command VM_COMMAND and the at least one policy, wherein the safety setting may include kernel protection, direct memory access (DMA) protection, isolated execution environment protection, application protection, or any other types of protection for kernel, and the at least one policy corresponds to the guest VMs 200_1, 200_2, . . . , 200_N. It should be noted that, safety settings of the primary VMs 240_1, 240_2, . . . , 240_M are independent of each other.

Each of the primary VMs 240_1, 240_2, . . . , 240_M may have the same or similar architecture. Take the primary VM 240_1 as an example. The primary VM 240_1 may include an agent 241, a kernel protection manager 242, and a protection manager 243. The agent 241 may be arranged to receive the at least one command VM_COMMAND sent from the command hub 220. The kernel protection manager 242 may be arranged to receive the at least one command VM_COMMAND sent from the agent 241 and a policy corresponding to the guest VM 200_1, and manage and configure the safety setting for the guest VM 200_1 according to the at least one command VM_COMMAND and the policy.

In this embodiment, a policy corresponding to the guest VM 200_1 is received by the kernel protection manager 242 of the primary VM 240_1; a policy corresponding to the guest VM 200_2 is received by a kernel protection manager (not shown) of the primary VM 240_2; and a policy corresponding to the guest VM 200_N is received by a kernel protection manager (not shown) of the primary VM 240_M (i.e. N=M and the guest VMs 200_1, 200_2, . . . , 200_N correspond to the primary VMs 240_1, 240_2, . . . , 240_M, respectively). The present invention is not limited thereto, however. In some embodiments, the primary VMs 240_1, 240_2, . . . , 240_M may only include one primary VM 240_1 (i.e. M=1), and a plurality of policies that correspond to the guest VMs 200_1, 200_2, . . . , 200_N, respectively, may be received by the kernel protection manager 242 of the primary VM 240_1. In some embodiments, the guest VMs 200_1, 200_2, . . . , 200_N may only include one guest VM 200_1 (i.e. N=1), and the policy that corresponds to the guest VM 200_1 may be received by kernel protection managers of the primary VMs 240_1, 240_2, . . . , 240_M.

The protection manager 243 may be arranged to manage and configure a safety protection component according to the safety setting provided by the kernel protection manager 242, wherein the safety protection component may include a Memory Management Unit (MMU) 290 and/or a Memory Protection Unit (MPU) 291. For example, the guest VM 200_1 sends a command for kernel protection to the primary VM 240_1 through the command hub 220, the agent 241 may be arranged to receive the command from the command hub 220, and the kernel protection manager 242 may be arranged to receive the command from the agent 241 and the policy corresponding to the guest VM 200_1, and manage and configure the safety setting (i.e. the kernel protection) for the guest VM 200_1 according to the command and the policy. Afterwards, the protection manager 243 may be arranged to manage and configure the safety protection component (e.g. the MMU 290 and/or the MPU 291) according to the safety setting provided by the kernel protection manager 242.

The transmission interface 260 may be arranged to bind the primary VMs 240_1, 240_2, . . . , 240_M to the hypervisor 280, and perform communications between the primary VMs 240_1, 240_2, . . . , 240_M and the hypervisor 280. In this way, only the primary VM that is bound to the hypervisor 280 by the transmission interface 260 is capable of communicating with the hypervisor 280 (e.g. sending a safety setting command to the hypervisor 280 for subsequent operations), which prevents other illegal users from utilizing the system 20. The hypervisor 280 may include a protection engine 281, wherein the protection engine 281 may be arranged to receive a ground rule and at least one safety setting command SAFETY COMMAND that is sent by the primary VMs 240_1, 240_2, . . . , 240_M through the transmission interface 260, and manage and configure the safety protection component (e.g. the MMU 290 and/or the MPU 291) according to the ground rule and the at least one safety setting command SAFETY COMMAND. It should be noted that, the ground rule is executed by the hypervisor 280, and is followed by both of the primary VMs 240_1, 240_2, . . . , 240_M and the hypervisor 280.

By sharing management for the hypervisor 280 through the primary VMs 240_1, 240_2, . . . , 240_M, that is, offloading at least a portion of a management task of the hypervisor 280 to the primary VMs 240_1, 240_2, . . . , 240_M, the complexity of the hypervisor 280 may be released (i.e. the hypervisor 280 may only need to execute the operations of protection mechanism), and the guest VMs 200_1, 200_2, . . . , 200_N may be allowed to run more complex software. In addition, instead of integrating the policies into the hypervisor 280, the vendors of the guest VMs 200_1, 200_2, . . . , 200_N only need to provide the policies to the primary VMs 240_1, 240_2, . . . , 240_M. As a result, the cost, the convenience, and the safety in the mass production stage of the products that include the system 20 may be improved. In other words, the hypervisor 280 only needs to execute the ground rule (where the policies that correspond to the guest VMs 200_1, 200_2, . . . , 200_N, respectively, may be executed by the primary VMs 240_1, 240_2, . . . , 240_M), which makes the hypervisor 280 more secure. Since the execution loss of the policies is not the main loss, the performance of the products that include the system 20 will not be degraded.

Figure 3:
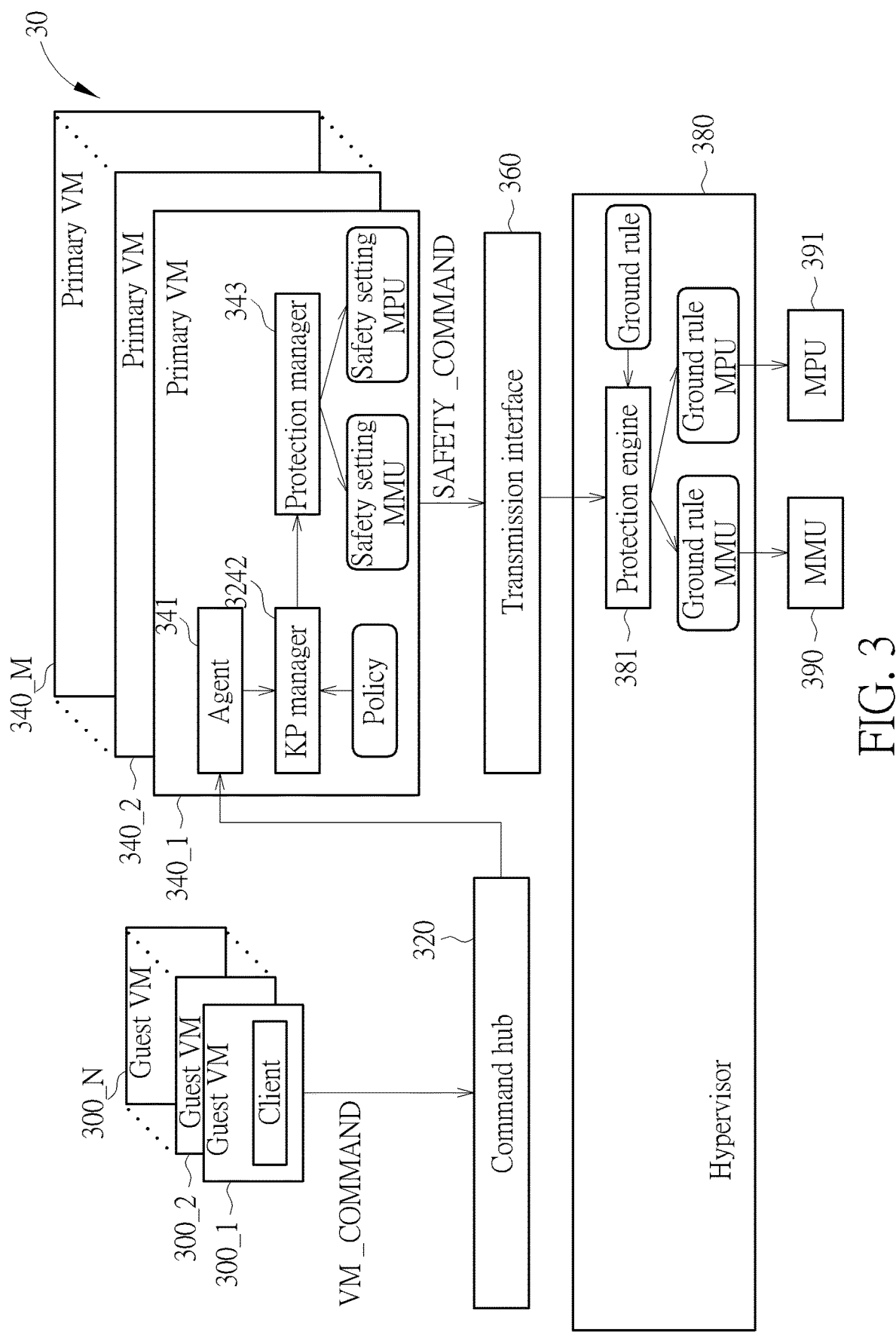
FIG. 3 is a diagram illustrating a system for kernel protection according to another embodiment of the present invention.

FIG. 3 is a diagram illustrating a system 30 for kernel protection according to another embodiment of the present invention. The system 30 may include a processor (e.g. the processor 12 shown in FIG. 1), a command hub 320, and a transmission interface 360. The processor may be arranged to execute software modules, including one or more guest VMs 300_1, 300_2, . . . , 300_N (N≥1), one or more primary VMs 340_1, 340_2, . . . , 340_M (M≥1), and a hypervisor 380. The guest VMs 300_1, 300_2, . . . , 300_N may be provided by different vendors, and "N" or "M" are positive integers that may be equal to or different from each other. The difference between the system 30 shown in FIG. 3 and the system 20 shown in FIG. 2 is that the command hub 320 of the system 30 is a hardware component external to the hypervisor 380 executed on the processor. For example, the command hub 320 may be a part of the hardware circuitry 16 shown in FIG. 1. In some embodiments, the transmission interface 360 can be implemented by either software or hardware. For brevity, similar descriptions for this embodiment are not repeated in detail here.

Figure 4:
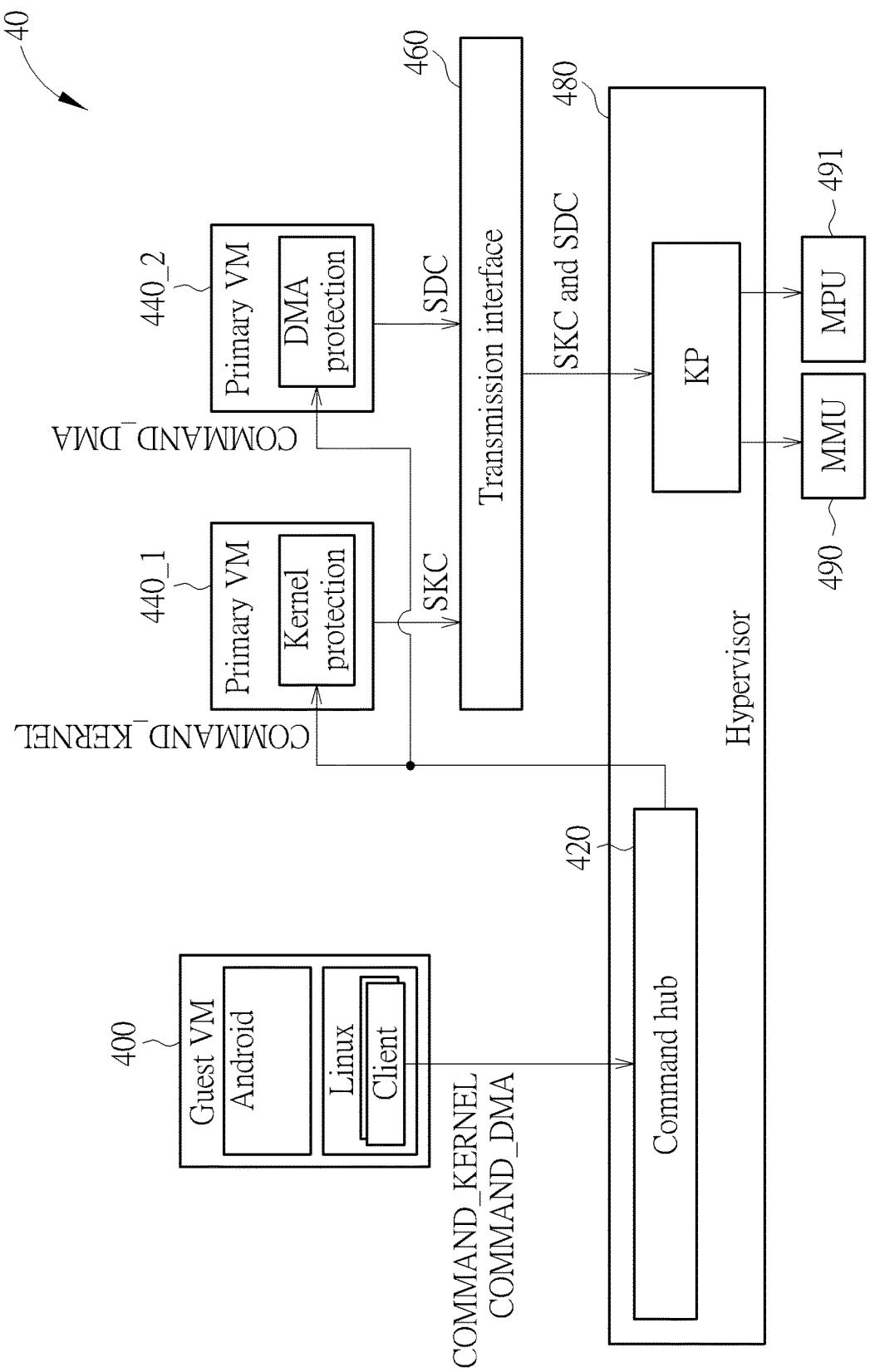
FIG. 4 is a diagram illustrating a system with one guest virtual machine (VM) and two primary VMs for kernel protection and direct memory access (DMA) protection according to an embodiment of the present invention.

FIG. 4 is a diagram illustrating a system 40 with one guest VM and two primary VMs for kernel protection and DMA protection according to an embodiment of the present invention. The system 40 shown in FIG. 4 may be implemented by the system 20 shown in FIG. 2. A skilled person should readily appreciate that the system 30 shown in FIG. 3 may also be employed to realize a system with one guest VM and two primary VMs for kernel protection and DMA protection. The system 40 may include a processor (e.g. the processor 12 shown in FIG. 1) and a transmission interface 460. The processor may be arranged to execute a guest VM 400, a command hub 420, two primary VMs 440_1 and 440_2, and a hypervisor 480. In this embodiment, the command hub 420 is a software module integrated in the hypervisor 480, but the present invention is not limited thereto. The command hub 420 may be implemented outside the hypervisor 480 as well. As shown in FIG. 4, the guest VM 400 may be an Android VM with a Linux kernel, and there are two clients in the guest VM 400. For example, one client is a phone maker, and the other client is a chip vendor, wherein the phone maker may send a command COMMAND_KERNEL for the kernel protection of the Linux that runs on the guest VM 400 to the command hub 420, and the chip vendor may send a command COMMAND_DMA for the DMA protection of the Linux that runs on the guest VM 400 to the command hub 420.

The primary VM 440_1 may be arranged to: receive the command COMMAND_KERNEL from the command hub 420 and a policy that corresponds to the guest VM 400; manage and configure the safety setting (e.g. the kernel protection) for the guest VM 400 according to the command COMMAND_KERNEL and the policy; and manage and configure the safety protection component (e.g. an MMU 490 and/or an MPU 491) according to the safety setting. In addition, the primary VM 440_1 may be arranged to send a safety setting command SAFETY_KERNEL_COMMAND (labeled as "SKC" in FIG. 4) to the hypervisor 480 through the transmission interface 460. For brevity, "Kernel protection" that is labeled in FIG. 4 may include the agent, the kernel protection manager, the protection manager, and the above-mentioned operations of the primary VM 440_1.

The primary VM 440_2 may be arranged to: receive the command COMMAND_DMA from the command hub 420 and the policy that corresponds to the guest VM 400; manage and configure the safety setting (e.g. the DMA protection) for the guest VM 400 according to the command COMMAND_DMA and the policy; and manage and configure the safety protection component (e.g. the MMU 490 and/or the MPU 491) according to the safety setting. In addition, the primary VM 440_2 may be arranged to send a safety setting command SAFETY_DMA_COMMAND (labeled as "SDC" in FIG. 4) to the hypervisor 480 through the transmission interface 460. For brevity, "DMA protection" that is labeled in FIG. 4 may include the agent, the kernel protection manager, the protection manager, and the above-mentioned operations of the primary VM 440_2.

The hypervisor 480 may be arranged to receive the ground rule and the two safety setting commands SAFETY_KERNEL_COMMAND and SAFETY_DMA_COMMAND, and manage and configure the safety protection component (e.g. the MMU 490 and/or the MPU 491) according to the ground rule and the two safety setting commands SAFETY_KERNEL_COMMAND and SAFETY_DMA_COMMAND. For brevity, "KP" that is labeled in FIG. 4 may include the protection engine and the above-mentioned operations of the hypervisor 480. In this embodiment, the safety setting (i.e. the kernel protection) of the primary VM 440_1 and the safety setting (i.e. the DMA protection) of the primary VM 440_2 are independent of each other. As a result, the phone maker and the chip vendor may independently perform the kernel protection and the DMA protection, respectively, without software integration in the hypervisor 480.

It should be noted that, in some embodiments, the kernel protection and the DMA protection may be performed through a same primary VM according to design requirements. For example, the processor may be arranged to execute only one primary VM (e.g. the primary VM 440_1). The primary VM 440_1 may be arranged to: receive the commands COMMAND_KERNEL and COMMAND_DMA from the command hub 420 and the policy that corresponds to the guest VM 400; manage and configure the safety setting (e.g. the kernel protection and the DMA protection) for the guest VM 400 according to the command COMMAND_KERNEL, the command COMMAND_DMA, and the policy; and manage and configure the safety protection component (e.g. the MMU 490 and/or the MPU 491) according to the safety setting. In addition, the primary VM 440_1 may be arranged to send the safety setting commands SAFETY_KERNEL_COMMAND and SAFETY_DMA_COMMAND to the hypervisor 480 through the transmission interface 460. For brevity, similar descriptions for those embodiments are not repeated in detail here.

Figure 5:
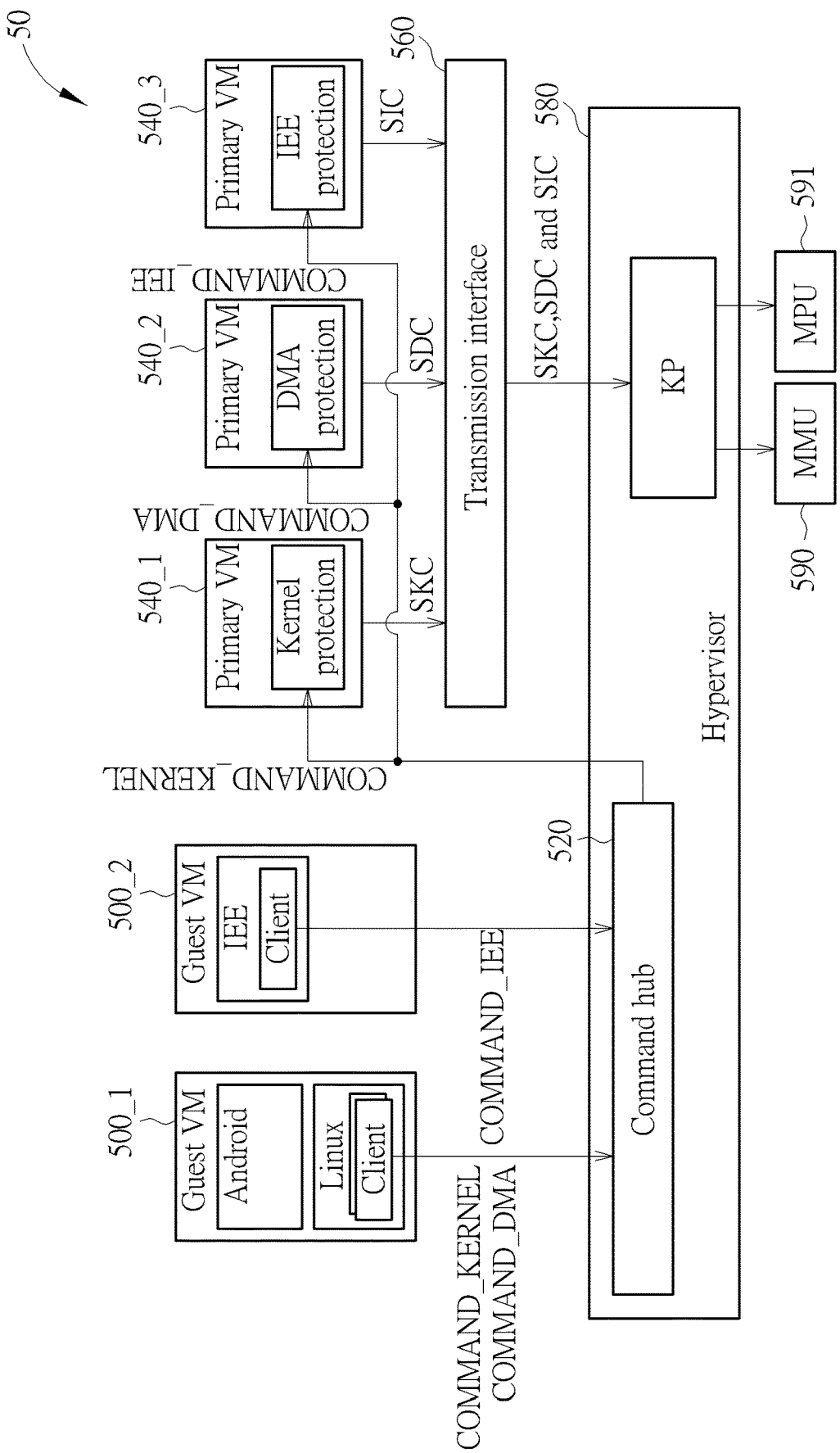
FIG. 5 is a diagram illustrating a system with two guest VMs and three primary VMs for kernel protection, DMA protection, and isolated execution environment protection according to an embodiment of the present invention.

FIG. 5 is a diagram illustrating a system 50 with two guest VMs and three primary VMs for kernel protection, DMA protection, and isolated execution environment protection according to an embodiment of the present invention. The system 50 shown in FIG. 5 may be implemented by the system 20 shown in FIG. 2. A skilled person should readily appreciate that the system 30 shown in FIG. 3 may also be employed to realize a system with two guest VMs and three primary VMs for kernel protection, DMA protection, and isolated execution environment protection. The system 50 may include a processor (e.g. the processor 12 shown in FIG. 1) and a transmission interface 560. The processor may be arranged to execute two guest VMs 500_1 and 500_2, a command hub 520, three primary VMs 540_1, 540_2, and 540_3, and a hypervisor 580. The command hub 520 is a software module integrated in the hypervisor 580 in this embodiment, but the present invention is not limited thereto. As shown in FIG. 5, the guest VM 500_1 may be an Android VM with a Linux kernel, and there are two clients in the guest VM 500_1. For example, one client is a phone maker, and the other client is a chip vendor, wherein the phone maker may send a command COMMAND_KERNEL for the kernel protection of the Linux that runs on the guest VM 500_1 to the command hub 520, and the chip vendor may send a command COMMAND_DMA for the DMA protection of the Linux that runs on the guest VM 500_1 to the command hub 520. The guest VM 500_2 may be a VM for an isolated execution environment (labeled as "IEE" in FIG. 5), wherein a client in the guest VM 500_2 may send a command COMMAND_IEE for isolated execution environment protection to the command hub 520.

The primary VM 540_1 may be arranged to: receive the command COMMAND_KERNEL from the command hub 520 and a policy that corresponds to the guest VM 500_1; manage and configure the safety setting (e.g. the kernel protection) for the guest VM 500_1 according to the command COMMAND_KERNEL and the policy; and manage and configure the safety protection component (e.g. an MMU 590 and/or an MPU 591) according to the safety setting. In addition, the primary VM 540_1 may be arranged to send a safety setting command SAFETY_KERNEL_COMMAND (labeled as "SKC" in FIG. 5) to the hypervisor 580 through the transmission interface 560. For brevity, "Kernel protection" that is labeled in FIG. 5 may include the agent, the kernel protection manager, the protection manager, and the above-mentioned operations of the primary VM 540_1.

The primary VM 540_2 may be arranged to: receive the command COMMAND_DMA from the command hub 520 and the policy that corresponds to the guest VM 500_1; manage and configure the safety setting (e.g. the DMA protection) for the guest VM 500_1 according to the command COMMAND_DMA and the policy; and manage and configure the safety protection component (e.g. the MMU 590 and/or the MPU 591) according to the safety setting. In addition, the primary VM 540_2 may be arranged to send a safety setting command SAFETY_DMA_COMMAND (labeled as "SDC" in FIG. 5) to the hypervisor 580 through the transmission interface 560. For brevity, "DMA protection" that is labeled in FIG. 5 may include the agent, the kernel protection manager, the protection manager, and the above-mentioned operations of the primary VM 540_2.

The primary VM 540_3 may be arranged to: receive the command COMMAND_IEE from the command hub 520 and a policy that corresponds to the guest VM 500_2; manage and configure the safety setting (e.g. the isolated execution environment protection) for the guest VM 500_2 according to the command COMMAND_IEE and the policy; and manage and configure the safety protection component (e.g. the MMU 590 and/or the MPU 591) according to the safety setting. In addition, the primary VM 540_3 may be arranged to send a safety setting command SAFETY_IEE_COMMAND (labeled as "SIC" in FIG. 5) to the hypervisor 580 through the transmission interface 560. For brevity, "IEE protection" that is labeled in FIG. 5 may include the agent, the kernel protection manager, the protection manager, and the above-mentioned operations of the primary VM 540_3.

The hypervisor 580 may be arranged to receive the ground rule and the three safety setting commands SAFETY_KERNEL_COMMAND, SAFETY_DMA_COMMAND, and SAFETY_IEE_COMMAND, and manage and configure the safety protection component (e.g. the MMU 590 and/or the MPU 591) according to the ground rule and the three safety setting commands SAFETY_KERNEL_COMMAND, SAFETY_DMA_COMMAND, and SAFETY_IEE_COMMAND. For brevity, "KP" that is labeled in FIG. 5 may include the protection engine and the above-mentioned operations of the hypervisor 580. It should be noted that, the safety setting (i.e. the kernel protection) of the primary VM 540_1, the safety setting (i.e. the DMA protection) of the primary VM 540_2, and the safety setting (i.e. the isolated execution environment protection) of the primary VM 540_3 are independent of each other.

It should be noted that, in some embodiments, at least two of the kernel protection, the DMA protection, and the isolated execution environment protection may be performed through a same primary VM according to design requirements. For example, the processor may be arranged to execute only one primary VM (e.g. the primary VM 540_1). The primary VM 540_1 may be arranged to: receive the commands COMMAND_KERNEL, COMMAND_DMA, and COMMAND_IEE from the command hub 520 and the policies that correspond to the guest VMs 500_1 and 500_2, respectively; manage and configure the safety setting (e.g. the kernel protection, the DMA protection, and the isolated execution environment protection) for the guest VMs 500_1 and 500_2 according to the commands COMMAND_KERNEL, COMMAND_DMA, COMMAND_IEE, and the policies; and manage and configure the safety protection component (e.g. the MMU 590 and/or the MPU 591) according to the safety setting. In addition, the primary VM 500_1 may be arranged to send the safety setting commands SAFETY_KERNEL_COMMAND, SAFETY_DMA_COMMAND, and SAFETY_IEE_COMMAND to the hypervisor 580 through the transmission interface 560. For another example, the processor may be arranged to execute two primary VMs (e.g. the primary VMs 540_1 and 540_2). The primary VM 540_1 may be arranged to receive the commands COMMAND_KERNEL and COMMAND_DMA from the command hub 520 and the policy that corresponds to the guest VM 500_1. The primary VM 540_2 may be arranged to receive the command COMMAND_IEE from the command hub 520 and the policy that corresponds to the guest VM 500_2. For brevity, similar descriptions for those embodiments are not repeated in detail here.

Figure 6:
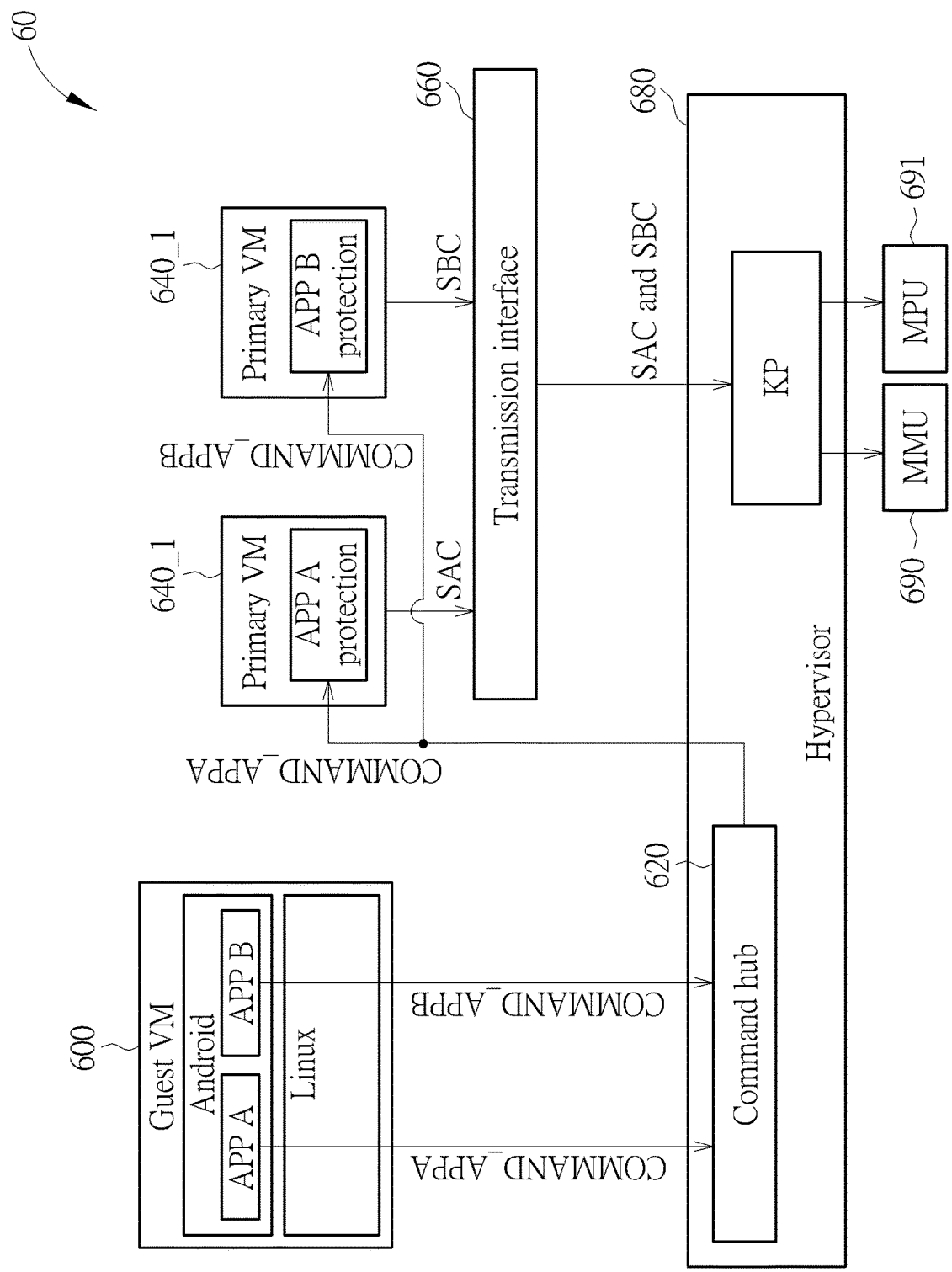
FIG. 6 is a diagram illustrating a system with one guest VM and two primary VMs for two application protections according to an embodiment of the present invention.

FIG. 6 is a diagram illustrating a system 60 with one guest VM and two primary VMs for two application (APP) protections according to an embodiment of the present invention. The system 60 shown in FIG. 6 may be implemented by the system 20 shown in FIG. 2. A skilled person should readily appreciate that the system 30 shown in FIG. 3 may also be employed to realize a system with one guest VM and two primary VMs for two APP protections. The system 60 may include a processor (e.g. the processor 12 shown in FIG. 1) and a transmission interface 660. The processor may be arranged to execute a guest VM 600, a command hub 620, two primary VMs 640_1 and 640_2, and a hypervisor 680. The command hub 620 is a software module integrated in the hypervisor 680 in this embodiment, but the present invention is not limited thereto. As shown in FIG. 6, the guest VM 600 may be an Android VM with a Linux kernel, and there are two APPs (e.g. an APP A and an APP B) running on the guest VM 600, wherein the APP A may send a command COMMAND_APPA for the APP protection of the APP A to the command hub 620, and the APP B may send another command COMMAND_APPB for the APP protection of the APP B to the command hub 620.

The primary VM 640_1 may be arranged to: receive the command COMMAND_APPA from the command hub 620 and a policy that corresponds to the guest VM 600; manage and configure the safety setting (e.g. the APP protection of the APP A) for the guest VM 600 according to the command COMMAND_APPA and the policy; and manage and configure the safety protection component (e.g. an MMU 690 and/or an MPU 691) according to the safety setting. In addition, the primary VM 640_1 may be arranged to send a safety setting command SAFETY_APPA_COMMAND (labeled as "SAC" in FIG. 6) to the hypervisor 680 through the transmission interface 660. For brevity, "APP A protection" that is labeled in FIG. 6 may include the agent, the kernel protection manager, the protection manager, and the above-mentioned operations of the primary VM 640_1.

The primary VM 640_2 may be arranged to: receive the command COMMAND_APPB from the command hub 620 and the policy that corresponds to the guest VM 600; manage and configure the safety setting (e.g. the APP protection of the APP B) for the guest VM 600 according to the command COMMAND_APPB and the policy; and manage and configure the safety protection component (e.g. the MMU 690 and/or the MPU 691) according to the safety setting. In addition, the primary VM 640_2 may be arranged to send a safety setting command SAFETY_APPB_COMMAND (labeled as "SBC" in FIG. 6) to the hypervisor 680 through the transmission interface 660. For brevity, "APP B protection" that is labeled in FIG. 6 may include the agent, the kernel protection manager, the protection manager, and the above-mentioned operations of the primary VM 640_2.

The hypervisor 680 may be arranged to receive the ground rule and the two safety setting commands SAFETY_APPA_COMMAND and SAFETY_APPB_COMMAND, and manage and configure the safety protection component (e.g. the MMU 690 and/or the MPU 691) according to the ground rule and the two safety setting commands SAFETY_APPA_COMMAND and SAFETY_APPB_COMMAND. For brevity, "KP" that is labeled in FIG. 6 may include the protection engine and the above-mentioned operations of the hypervisor 680. In this embodiment, the safety setting (e.g. the APP protection of the APP A) of the primary VM 640_1 and the safety setting (e.g. the APP protection of the APP B) of the primary VM 640_2 are independent of each other. As a result, the APP A and the APP B may be provided by different vendors.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A system for kernel protection, comprising:
 a processor, arranged to execute:
   at least one guest virtual machine (VM), wherein the at least one guest VM is arranged to send at least one command to a command hub, and provide at least one policy to at least one primary VM;
   the at least one primary VM, having a protection manager, wherein the at least one primary VM is bound to a hypervisor through a transmission interface for performing communications, and the at least one primary VM is arranged to:
     receive the at least one command sent from the command hub;
     receive, at the protection manager, the at least one policy from the at least one guest VM; and
     manage and configure a safety setting according to the at least one command and the at least one policy, where the at least one policy corresponds to the at least one guest VM usage of resources; and
   the hypervisor, having a protection engine, and arranged to:
     receive, at the protection engine, a ground rule and at least one safety setting command sent by the at least one primary VM; and process the at least one safety setting configuration command with the ground rule including configure and manage at least one safety protection component on the resources according to the ground rule and the at least one safety setting command.

2. The system of claim 1, wherein the at least one primary VM comprises a plurality of primary VMs, and safety settings of the plurality of primary VMs are independent of each other.

3. The system of claim 1, wherein the processor is further arranged to execute the command hub that is a software module integrated in the hypervisor.

4. The system of claim 1, further comprising:
the command hub;
wherein the command hub is a hardware component external to the hypervisor executed on the processor.

5. The system of claim 1, wherein the safety protection component comprises a memory management unit (MMU) or a memory protection unit (MPU).

6. The system of claim 1, wherein the safety setting comprises at least one of kernel protection, direct memory access (DMA) protection, isolated execution environment protection, and application protection.

7. The system of claim 1, wherein the ground rule is executed by the hypervisor, and is followed by the at least one primary VM and the hypervisor.

8. The system of claim 1, wherein the at least one primary VM comprises a first primary VM and a second primary VM, the safety setting configured by the first primary VM comprises kernel protection of an operating system (OS) running on the at least one guest VM, and the safety setting configured by the second primary VM comprises direct memory access (DMA) protection of the OS running on the at least one guest VM.

9. The system of claim 1, wherein the at least one primary VM comprises a first primary VM, a second primary VM, and a third primary VM; the at least one guest VM comprises a first guest VM and a second guest VM; the safety setting configured by the first primary VM comprises kernel protection of an operating system (OS) running on the first guest VM, the safety setting configured by the second primary VM comprises direct memory access (DMA) protection of the OS running on the first guest VM, and the safety setting configured by the third primary VM comprises protection of an isolated execution environment on the second guest VM.

10. The system of claim 1, wherein the at least one primary VM comprises a first primary VM and a second primary VM, the safety setting configured by the first primary VM comprises protection of a first application running on the at least one guest VM, and the safety setting configured by the second primary VM comprises protection of a second application running on the at least one guest VM.

11. A method for kernel protection, comprising:
sending, by at least one guest virtual machine (VM), at least one command directly to a command hub;
providing, by the at least one guest VM, at least one policy to at least one primary VM;
binding, by a transmission interface, the at least one primary VM to a hypervisor for performing communications, wherein the at least one primary VM has a protection manager, and the hypervisor has a protection engine;
receiving, by the at least one primary VM, the at least one command sent from the command hub;
receiving, by the at least one primary VM, the at least one policy from the at least one guest VM at the protection manager;
managing and configuring, by the at least one primary VM, a safety setting according to the at least one command and the at least one policy, where the at least one policy corresponds to the at least one guest VM usage of resources;
receiving, by the hypervisor, a ground rule and at least one safety setting command sent by the at least one primary VM at the protection engine; and
processing the at least one safety setting configuration command with the ground rule include configuring and managing, by the hypervisor, at least one safety protection component on the resources according to the ground rule and the at least one safety setting command.

12. A non-transitory computer-readable medium storing a set of instructions, the set of instructions comprising one or more instructions that, when executed by a processor, cause the processor to perform the method comprising:
sending, by at least one guest virtual machine (VM), at least one command directly to a command hub;
providing, by the at least one guest VM, at least one policy to at least one primary VM;
binding, by a transmission interface, the at least one primary VM to a hypervisor for performing communications, wherein the at least one primary VM has a protection manager, and the hypervisor has a protection engine;
receiving, by the at least one primary VM, the at least one command sent from the command hub;
receiving, by the at least one primary VM, the at least one policy from the at least one guest VM at the protection manager;
managing and configuring, by the at least one primary VM, a safety setting according to the at least one command and the at least one policy, where the at least one policy corresponds to the at least one guest VM usage of resources;
receiving, by the hypervisor, a ground rule and at least one safety setting command sent by the at least one primary VM at the protection engine; and
processing the at least one safety setting configuration command with the ground rule include configuring and managing, by the hypervisor, at least one safety protection component on the resources according to the ground rule and the at least one safety setting command.

* * * * *